United States Patent
Roe et al.

(10) Patent No.: US 7,359,964 B2
(45) Date of Patent: Apr. 15, 2008

(54) METHOD AND EQUIPMENT FOR PROVIDING A SIGNALING CHANNEL FOR PERFORMING SIGNALING FUNCTIONS AT AN ETHERNET LEVEL

(75) Inventors: Erez Roe, Tel-Aviv (IL); Amir Peled, Bat-Hefer (IL)

(73) Assignee: ECI Telecom Ltd., Petach Tikva (IL)

( * ) Notice: Subject to any disclaimer, the term of this patent is extended or adjusted under 35 U.S.C. 154(b) by 384 days.

(21) Appl. No.: 10/090,791

(22) Filed: Mar. 6, 2002

(65) Prior Publication Data

US 2002/0138611 A1    Sep. 26, 2002

(30) Foreign Application Priority Data

Mar. 21, 2001   (IL) .................................... 142156

(51) Int. Cl.
*G06F 13/00*    (2006.01)

(52) U.S. Cl. ................................................. 709/224

(58) Field of Classification Search ............... 709/204, 709/223; 370/218; 714/751
See application file for complete search history.

(56) References Cited

U.S. PATENT DOCUMENTS 5,666,293 A    9/1997    Metz et al.
6,466,984 B1*  10/2002   Naveh et al. ............... 709/228
6,771,671 B1*  8/2004    Fields et al. ................ 370/514
6,775,799 B1*  8/2004    Giorgetta et al. ........... 714/751
6,865,149 B1*  3/2005    Kalman et al. ............. 370/225

FOREIGN PATENT DOCUMENTS

WO    WO 99/25096        5/1999
WO    WO 00/62501        10/2000
WO    WO 01/08356 A1     2/2001

OTHER PUBLICATIONS

James Kurose, Keith Ross, Computer Networking p. 415-416.*
Draft Revised Recommendation 1.610; B-ISDN Operation and Maintenance Principles and Functions; revised version-Aug. 1998.

* cited by examiner

*Primary Examiner*—Robert B Harrell
(74) *Attorney, Agent, or Firm*—Harold L. Novick; Matthew J. Moffa; The Nath Law Group

(57) ABSTRACT

A method is disclosed for providing a signaling channel for performing one or more signaling functions at the Ethernet level. The telecommunication of interest is organized by information packets forming an information flow, and the method comprises utilizing a combined flow composed of the information flow and one or more service flows formed from service packets being multiplexable with the information packets at the Ethernet level. The service packets belonging to a particular service flow carry an indication of a signaling function to be performed, while the one or more service flows form the signaling channel at the Ethernet level.

17 Claims, 3 Drawing Sheets

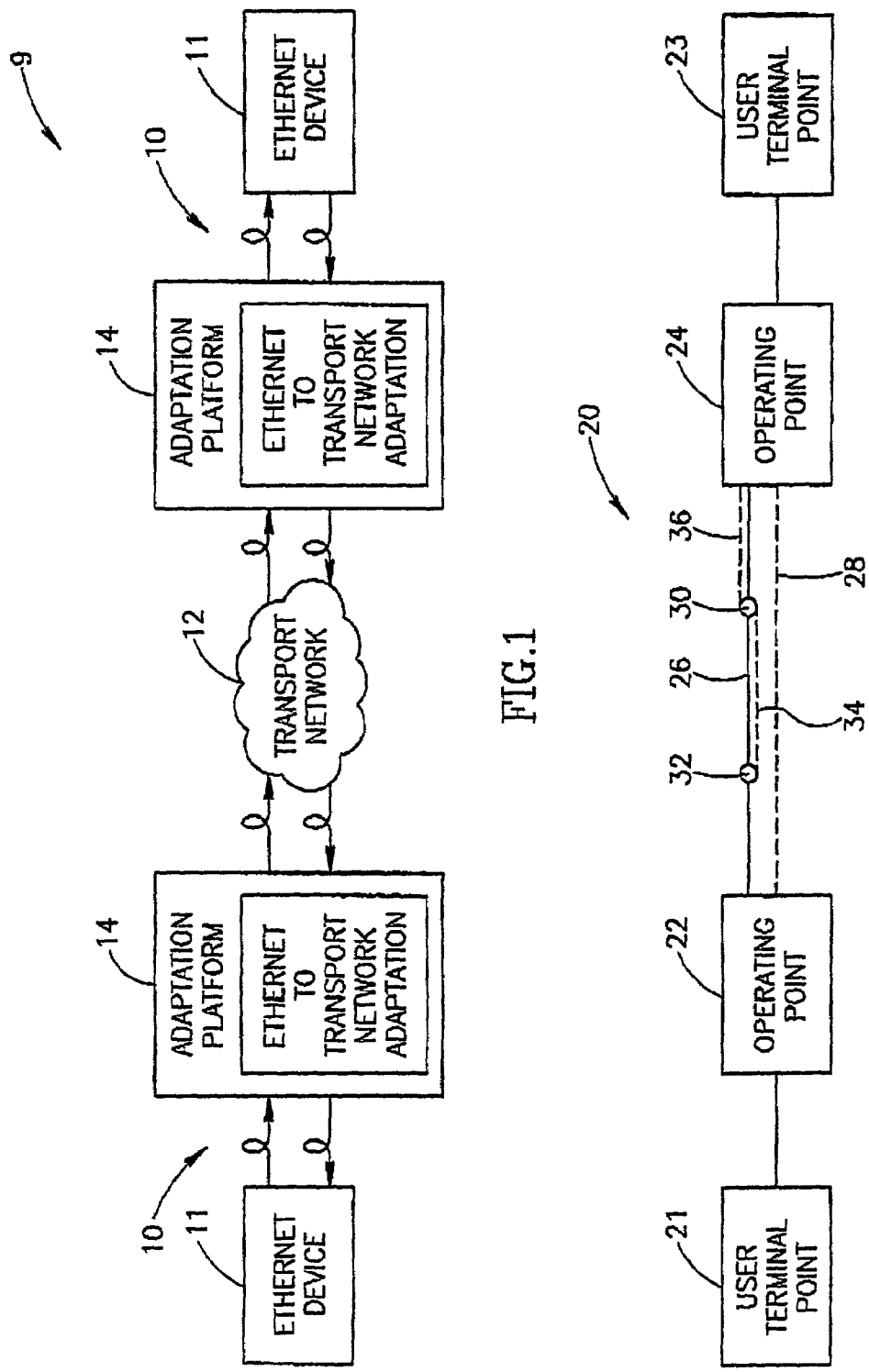

METHOD AND EQUIPMENT FOR PROVIDING A SIGNALING CHANNEL FOR PERFORMING SIGNALING FUNCTIONS AT AN ETHERNET LEVEL

FIELD OF THE INVENTION

The present invention relates to signaling in local area packet networks and/or in wide area (transport) networks.

BACKGROUND OF THE INVENTION

Packet networks such as IP, Ethernet, ATM, FC (Fiber channel) operate according to protocols defining burst-like transmission of information units called packets or cells, wherein the length and contents of the packets in each specific network are predetermined by the suitable standards and protocols.

The Ethernet network protocol was one of the first protocols developed for packet networks, and initially was designed for serving local area networks (LANs) where the problem of signaling was not critical at the time. The Ethernet signaling mechanism which was originally designed comprises a so-called "auto-negotiation" mechanism. Though, it is not sufficient for many novel requirements which modern networks impose.

Presently, not only the modern LANs grew, but as a rule, they are now interconnected by wide area networks (WANs) which operate according to totally different protocols. That is a result of one of the trends in the modern world of communications where integration of various types of networks becomes more and more popular. For example, a communication path between two end users or providers may include both network sections utilizing packet framing (such as IP or Ethernet), and sections of optical networks such as SDH or SONET utilizing so-called virtual containers which are complex aggregated structures of digital frames. For transmitting Ethernet packets, digital frames of SONET/SDH envelope the information comprised in the Ethernet packets (SONET/SDH is generally considered a lower level, and Ethernet—a higher level).

It should be noted that SONET and SDH networks support a wide range of signaling and checking means. For example, SDH and SONET protocols comprise a set of functions of a so-called Tandem Connection feature (SDH TC feature). One of such functions serves to distinguish errors which appear in a particular network domain path enclosed between a Source and a Sink of its Tandem Connector, from external errors received by the domain with the incoming information flow. On the other hand, such tools are designed for virtual containers and cannot specify errors taking place at any higher layer, say in Ethernet packets contents of which is mapped in the "carrier" virtual container frames. It means that information provided by the SDH TC feature is insufficient for revealing sources of errors and handling associated problems if they reside in the packet network sections.

According to the a Standard recommendation of an International Telecommunication Union ITU-T I.610 (February 1999), Asynchronous Transfer Mode networks are provided with so-called Operation And Maintenance functions (OAM functions) for performance monitoring, defect and failure detection/information, system protection and fault localization. For accomplishing the performance monitoring, maintenance information is produced from user information; this maintenance information is added to the user information at the source of a connection/link and extracted at the sink of a connection/link. Analysis of the maintenance event information at the sink of the connection allows estimation of the transport integrity.

To the best of the Applicant's knowledge, none of the presently known standard recommendations, patent documents or other sources describes or suggests any signaling means for monitoring Ethernet packets when transmitted via any network domain, in particular via a SONET or SDH network.

OBJECT OF THE INVENTION

It is therefore an object of the invention to provide a method and a system for arranging a signaling function in a packet network such as Ethernet by utilizing means available in the suitable protocol and/or not contradicting to it.

SUMMARY OF THE INVENTION

There is a long felt need to measure and analyze packets of Ethernet, Internet, and some other packet networks when they are transmitted within a lower level frame, for examples, when enveloped in an SDH/SONET frame. It has been realized by the Inventors that, for various purposes, such measurement and analysis is essential. For example, for proper billing of an Ethernet subscriber transferring packets via an SDH transport network, a management system has to know how many Ethernet packets passed during a particular period of time, how many frames of those passed satisfy requirements of quality, etc. It should be emphasized that any maintenance monitoring performed at the SDH level does not help to answer these questions. Such maintenance monitoring means that at the receiving end, where the Ethernet information is recovered from the SDH frames, no statistical information will be available on functioning of the Ethernet domain.

In view of the above, the object of the invention can be achieved by a method of providing a signaling channel for performing one or more signaling functions at the level of Ethernet (being a packet network where communication is performed by means of information packets forming an information flow). The method comprises utilizing a combined flow composed from said information flow and one or more service flows formed from service packets that are compatible with said information packets, wherein the service packets belonging to a particular service flow carry an indication of a corresponding one of said signaling functions to be performed, while said one or more service flows form the signaling channel at the level of Ethernet.

More particularly, for providing the signaling channel at the level of Ethernet between a first and a second operating points in a network domain, the method comprises steps of:

arranging at the first operating point a source adaptation element capable of receiving the information flow from a first Ethernet device, arranging at the second operating point a sink adaptation element capable of transmitting the information flow to a second Ethernet device, producing at the source adaptation element the service packets forming said one or more service flows, at the source adaaptation element, merging said one or more service flows with the information flow, thereby obtaining the combined flow with the signaling channel, transmitting data comprised in the combined flow via the network domain from the source adaptation element to the sink adaptation element, at the sink adaptation element, extracting the service packets of said one or more service flows from said combined flow and processing said service packets, thereby performing said one or more signaling functions.

The step of producing the service packets forming said one or more service flows is performed, at the source adaptation element, based on monitoring the information flow and/or monitoring external instructions.

The step of introducing the service packets into the information flow is preferably performed by multiplexing, and the step of extracting by demultiplexing. The service packets are considered compatible with the information packets if they are equal sized or just suitable for multiplexing with one another.

It should be noted that a span of the network domain between the two operating points may include one or more monitoring points. The basic two operating points comprise a source adaptation element and a sink adaptation element respectively. The monitoring point differs from a sink adaptation element by the fact that it enables analyzing the service flow but does not terminate it. On the other hand, the monitoring operation may be provided also on a sink adaptation element, using its service flow(s). Therefore, the signaling channel will be maintained between any two points, whether they are an operating point or a monitoring point. The monitoring points may coincide with said (basic) operating points, though this is not obligatory.

Likewise, the span between said two (basic) operating points (a source and a sink) may include an additional operating point comprising an additional source adaptation element and/or another sink adaptation element. Therefore, two or more signaling channels may be formed in the span between a particular couple of operating points. Furthermore, the additional operating points may serve as monitoring points.

From the point of structure of the network domain, the operating points may coincide (and may not) with terminal user points.

Further, the span of the network domain between said two operating points (as well as a span between any two of said operating and/or monitoring points) may comprise links (or segments) which belong to Ethernet only. In this case, the combined signaling and information flow will be created in the pure Ethernet, the achievement which has not been known yet for the Ethernet.

According to another, and preferred, embodiment, the mentioned span of the network domain may comprise a segment (segments) of a transport or wide area network, for example a network such as SONET or SDH. They may alternate, and may not, with segment(s) of the Ethernet packet network. In this case, the signaling channel at the level of the packet network will be preserved also during the information transfer via the transport network, and will be thus available at any selected monitoring or operating point.

To preserve the signaling channel at the Ethernet level in such a hybrid network domain, the combined flow comprising it should be either mapped into a frame of the transport network, or de-mapped therefrom, whenever needed.

In case the span between said two operating points comprises a section of a transport network, the method further comprises steps from the following list:

mapping packets of the combined (signaling and information) flow into the transport network frames (for example, into SONET/SDH virtual containers) for transmitting said packets via the transport network, de-mapping the transport network frames for transmitting the packets of the combined flow via the packet network, thereby preserving the signaling channel at the Ethernet level.

Actually, the method teaches arranging the mentioned signaling channel enabling a set of signaling functions in the Ethernet to be performed, by utilizing means available in the Ethernet packet protocol (i.e., its basic information transmitting functions such as various possible lengths of the packets, various possible types of the packet headers, etc). In addition, the method teaches using modified means which are not known in the Ethernet protocol but do not contradict it since are only used between the two operating points in the network domain and thus do not affect any outside network elements and communication.

Namely, the method comprises indication of each particular signaling function in the header of a service packet. In addition, data on the particular signaling function can be provided in the data field of a service packet.

The proposed set of the signaling functions comprises one or more functions selected from the following non-exhaustive list:

performance monitoring functions including at least one Tandem Connection (TC) function, one way and round trip delay measurement function, far end status (or far end link indication) function, connection integrity check function, buffer fill check function, function for enabling congestion indication and rate control.

The TC functions are intended for analyzing quality of transmission via a section of Ethernet network or a section of another packet or transport network via which said signaling channel is arranged.

All these functions can be performed by introducing various types of the service packets forming the above-mentioned so-called service flows and may utilize specific processing programs at the operating points.

Most of the above-mentioned signaling functions do not have analogs in other signaling systems.

By providing the above described procedure, any two Ethernet entities (modules, devices, nodes, cards) will be able to communicate at the Ethernet level either directly or through any transport network, performing signaling functions which have not been available before.

According to other two aspects of the invention, there are also proposed:

A source adaptation element for creating a signaling channel for performing one or more signaling functions at the level of Ethernet, capable of:

receiving Ethernet information packets forming an information flow, producing one or more service flows of service packets compatible with said information packets, wherein the service packets belonging to a particular service flow carry indication of a specific signaling function to be performed, and composing from said information flow and said one or more service flows an outgoing combined flow with the signaling channel formed by said one or more service flows.

The mentioned one or more service flows can be produced by a source function block, based on monitoring at least one of the following two processes: the information flow and external instructions. For example, a delay measurement signaling function can be activated upon an external instruction only.

Further, the source adaptation element may comprise a mapping unit for transmitting the outgoing combined flow via a transport network by the transport network frames, thereby ensuring transmission of the contents of a signaling channel via the transport network.

Similarly, there is provided a sink adaptation element capable of terminating a signaling channel for performing one or more signaling functions at the level of Ethernet. The sink adaptation element is capable of:

receiving an incoming combined flow composed from an information flow of Ethernet packets and one or more service flows formed from service packets compatible with the information packets, separating from said combined flow the one or more service flows and analyzing the one or more service flows to perform said signaling functions respectively assigned to said service flows.

The sink element is preferably provided with a de-mapping block capable of obtaining said incoming combined flow from frames of a transport network which envelope the combined flow, thereby ensuring receiving the signaling channel via the transport network and analyzing thereof at the Ethernet level.

Further, an assembly can be designed for creating a first signaling channel at the level of the Ethernet, and for analyzing a second (e.g., an oppositely directed) signaling channel at the level of the Ethernet To this end, the assembly will comprise the source adaptation element and the sink adaptation element as described above. Preferably, the assembly is located on a card intended for installing in a network node. If the source adaptation element and the sink adaptation element of the assembly are respectively provided with a mapper and a de-mapper, the assembly can be considered an adaptation block for connecting between an Ethernet packet network and a transport network.

According to yet another aspect of the invention, there is proposed a system capable of performing the described novel method in any network domain comprising Ethernet, i.e. for providing a signaling channel intended for performing one or more signaling functions at the Ethernet level.

The system providing a signaling channel for performing one or more signaling functions at the level of the Ethernet, which can be arranged between the above-described source adaptation element and sink adaption element serving one and the same signaling channel.

The system can be arranged in the Ethernet packet network and, optionally, in any other transport network such as SONET, SDH and the like, connected to the packet network.

BRIEF DESCRIPTION OF THE DRAWINGS

The invention will further be described with reference to the attached non-limiting drawings, in which:

FIG. 1 illustrates one example of a network configuration where two user Ethernet equipment entities are connected via a transport network segment, through two adaptation blocks.

FIG. 2 schematically illustrates a system with a combined channel for transmitting signaling and information packets between two user terminals, with the aid of a source element and a sink element in Ethernet.

DETAILED DESCRIPTION OF THE PREFERRED EMBODIMENTS

Figure 3:
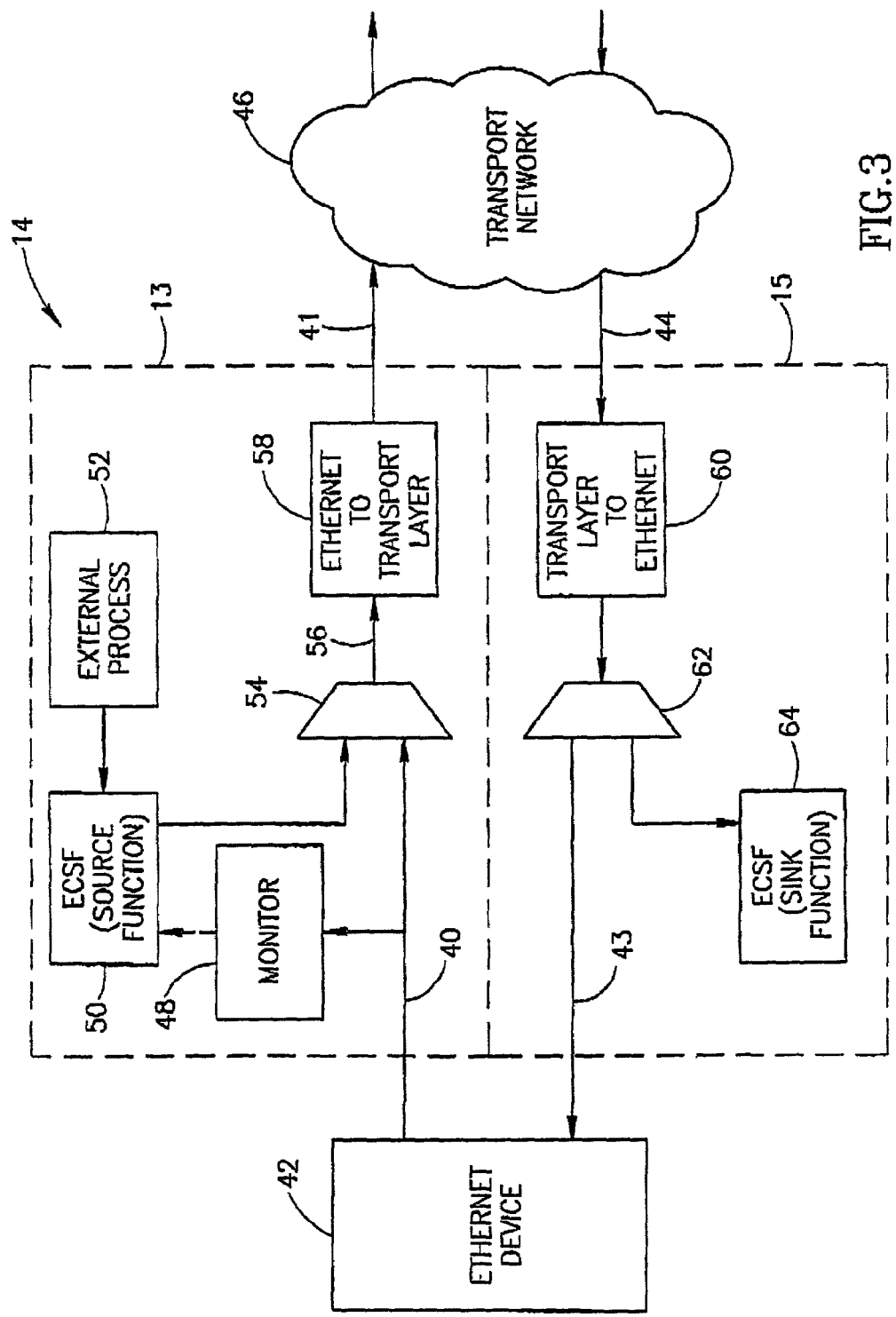
FIG. 3 illustrates an adaptation block for creating a combined signaling-information channel, with TC functions, in a packet network such as Ethernet.

FIG. 1 shows a typical channel via an integrated network domain 9 where two Ethernet (packet network) sections 10 are connected through a WAN (transport) section 12. In this embodiment, section 12 can be the SDH, SONET or an optical network. In the drawing, the different network sections are connected via a pair of blocks 14 for Ethernet to transport adaptation. The adaptation blocks 14 are responsible for receiving the Ethernet traffic from user terminals (Ethernet devices) 11, processing it and mapping it into the transport layer, say, into a SONET/SDH data stream (trail). So in sections 10, communication is performed at the Ethernet layer, while between the blocks 14 communication is performed at the transport layer. Further, the adaptation blocks are characterized in that they participate in creating and processing a combined communication flow in the Ethernet traffic. This will be described in more details with reference to the following drawings.

FIG. 2 schematically illustrates a path 20 between two user terminal points 21 and 23 belonging to either one and the same, or two different, Ethernet networks. In this example, the path comprises two operating points 22 and 24, wherein the operating point 22 is a source performing source functions, and point 24 is a sink performing sink functions of the path. Owing to that, the path acquires a signaling channel (marked with a dashed line 28) which carries a so-called signaling flow that is combined with the Ethernet information flow between the points 22 and 24. In the drawing, one path traffic segment is marked 26, which is defined by two points (usually, nodes) 32 and 30 lying on the total path 20. This segment may indicate, for example, a transport network portion via which Ethernet packets are to be transferred. The points 30 and 32 can be so-called monitoring points i.e., these locations may serve for analysis of the signaling channel 28 and/or of the traffic between the operating points 22 and 24. In case there is a transport network section between 32 and 30, the monitoring points can be provided with adaptation equipment for mapping and de-mapping. The monitoring points do not have to be provided with source/sink functions. In another embodiment, when the points 30 and 32 are equipped to provide such functions, an additional signaling channel can be created there-between (line 34), and/or between the points 32-22 and points 30-24, 22-30, 32-24 (line 36 is shown as an example). As can be seen, more than one signaling channel may be arranged in the path.

FIG. 3 illustrates which operations are performed at an adaptation block marked 14 in FIG. 1 for achieving the purpose of the present invention. The adaptation block 14 is an assembly comprising a source element 13 and a sink element 15. The adaptation block includes two pairs of input-output contacts. One pair comprises an input 40 connected to an Ethernet device 42 (it may be a terminal device, but may be not) for receiving its information flow, and a corresponding output 41 is connected to a transport network 46. The other pair consists of an input 44 receiving a combined data and signaling flow from the transport network 46, and an output 43 connected to the Ethernet. In this drawing, the output 43 is directly connected to the device 42. In the ingress direction, the Ethernet packets are received by the source element 13 from the device 42 and are monitored by a monitor 48 for various parameters of the information flow. Based on results of the monitoring, and based on specifically stated rules pre-programmed in an operating unit 50, the source element may initiate one or more so-called Ethernet Connection Signaling Functions. (Block 50 is therefore called ECSF block). More particularly, the operating block 50 performs a source function i.e., generates a series of Ethernet flows of service packets, each flow for a specific signaling function. Each of these flows has a distinct identifier which is carried inside the service packet thus turning it into a specific packet type.

Alternatively or in addition, the ECSF block 50 may generate service packets flows (for example, of a delay measurement function) which are not based on parameters of the received Ethernet traffic, but on data concerning any other, external, parameters, processes or instructions. Such events are schematically marked by an arrow arriving from block 52.

The information flow of the Ethernet device combined and the service packets (created by the block 50 in the form of one or more service flows) are then multiplexed by a multiplexer 54 to create a combined information and signaling flow via an intermediate connector 56. In this particular embodiment of the source element, block 58 performs mapping of the combined flow into transport frames of the transport layer, and transmits it to the transport network 46 via the output 41 which can be connected to an optical fiber.

In the opposite direction, another Ethernet device (not shown) transmits its signal to the transport network 46, its signal being processed in the manner as described above. The obtained transport flow from the network 46 arrives to the input 44 of the adaptation block 14, undergoes a de-mapping procedure at a block 60 of the sink element 15 and then, after the received combined information and signaling Ethernet packet flow is extracted from the transport network frames, it is demultiplexed by a demultiplexer 62. Thus, the signaling information added in the form of service packets by an Ethernet source block at the opposite side (not shown), is terminated at an operating block 64 ECSF which analyzes the received signaling channel and discards the service flow(s) thereupon. Block 64, inter alia, performs an Ethernet Tandem Connection Sink Function. The information flow, separated from the service (signaling) flow, is transmitted to the Ethernet device 42 via the output 43 of the adaptation block 14.

It should be noted, that the ECSF (signaling source and/or sink functions) may be embedded in a node of any segment on the Ethernet path. This may be used to monitor the Ethernet end-to-end traffic on a per segment basis, even when it passes through different network segments (which, in turn, may be controlled by different administrative systems).

The described embodiment, where the source element and the sink element are combined in one assembly, is only an example which is preferred but not obligatory. A signaling channel at the Ethernet level may be formed between a single source element 13 and a single sink element 15 respectively located at distant nodes of a network domain. If the network domain fully belongs to Ethernet, elements 13 and 15 may miss blocks 58 and 60, respectively.

Figure 4A:
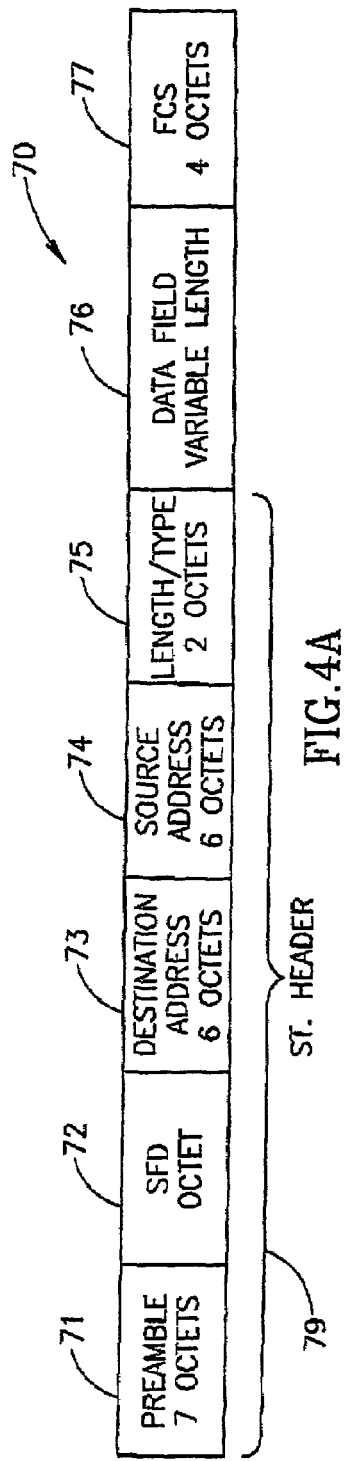
FIG. 4a illustrates an exemplary structure of a service (signaling) packet intended for performing signal channel functions in Ethernet.

FIG. 4a illustrates an example of a service Ethernet packet (frame) suitable for forming a signaling channel in the combined communication flow. In this figure, the service packet marked 70 comprises the following fields which are standard for information packets: Preamble (marked 71), Start of Frame Delimiter SFD (72), Destination address (73), Source address (74), Length/type (75) all forming a header, Data field (76), and a trail field Frame Check Sequence FCS (77). The minimal length of the shown basic standard Ethernet frame is 64 bytes. The maximal length of the basic standard Ethernet frame is 1518 bytes. (It should be noted, however, that when using additional so-called VLAN fields, the maximal lengths is 1522 bytes.)

The Inventors proposed a number of ways for using the standard size/structure of the Ethernet packets to indicate (and support) various signaling functions:

1) to use the standard Length/type field 75 for indication,
2) to build an additional field in the header for indicating specific signaling functions,
3) to build a new structure of the header and assigning in it a field for indicating specific signaling functions,
4) to build a new structure of the frame.

According to the example (a) shown in the drawing, field 75 is utilized for this purpose.

The structure of the field comprises four nibbles (groups of four bits each), which have the following meaning:

The first nibble will contain a fixed value, identifying the frame as a signaling channel (ECSC) frame. For example, this nibble is fixed at the value of A in hexadecimal format A (Hex). The second two forth nibbles (12 bits) are used to identify the specific signaling function/flow which the frame belongs to. For example, some Ethernet signaling functions can be identified as follows in these 12 bits of field 75:

003 (Hex)—the frame belongs to so-called Far End Link Status/link indication (FELS) function, 00C (Hex)—the frame belongs to the TC function from the group of Performance monitoring (PM) functions, The DATA field of the service packet changes from one Ethernet signaling function to another. It contains both instruction sub-fields, and information sub-fields carried to the destination and related to the signaling function.

Figure 4B:
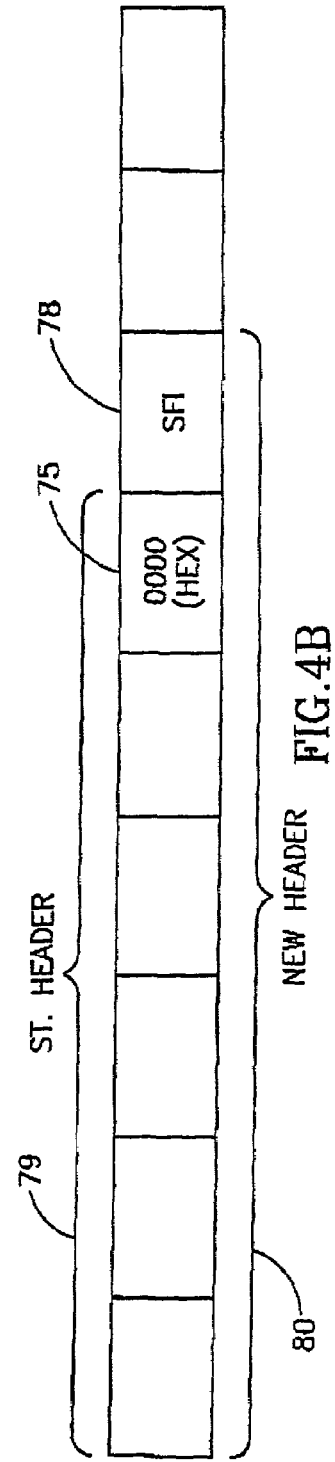
FIG. 4b illustrates another example of a service (signaling) packet for performing signaling functions in Ethernet.

FIG. 4b illustrates another example of the service packet (frame format), where a new filed 78 is created and called Service Function Identifier (SFI) field. The field is built in the bytes following after the standard header and should be considered part of a new header (schematically marked 80) which is wider than the standard header 79. It is proposed that in this case field 75 be all-zero bytes.

Any of the proposed Ethernet service frames contains specific information on a particular signaling function in its header. It means that by reading the header only (e.g.,—the TYPE field 75 or SFI field 78 in the header), one can identify to which specific signaling function the frame belongs which results in fast filtering of any irrelevant/unwanted data.

In order to explain which signaling functions/flows may be used in the Ethernet signaling channel, some examples will be presented below in more detail. Before specifying these functions/flows, it should be noted that, based on the proposed mechanism of introducing one or more of the signaling flows into the information flow of Ethernet, any new kind of flow can be added to the same mechanism. Any new kind of flow will be characterized by a new frame type identified by assigning to it a TYPE field code, an SFI field code (or the like), differing from those used for other signaling functions.

1. Far End Link Status/Link Indication (FELS) Ethernet Signaling Function

For example, a transport network different than Ethernet could be connecting two (local and remote) Ethernet links. The FELS function reports the far end link status to the local end (e.g. "link down", "link synchonizing", "link up". As a result, the far end will enable/disable transmission of data from the local (near) end. The link indication can be used, for pointing the link type (optical, electric, wireless).

2. Performance Monitoring (PM) Ethernet Signaling Flow Having Newly Proposed Parameters and Checking Methods This function monitors performance parameters of a received Ethernet stream (both at a source and a sink elements), such as:

Total number of frames received;
Number of frames received with no errors;
Number of frames received with errors;
Number of frames received with CRC errors;
Number of frames received with an internal processing error;
Number of frames received with length below the minimum frame size;
Number of frames received with length above the maximum frame size;
Number of service flow frames correctly received;
Number of service flow frames received with errors;
Number of information frames received in each group size (group sizes are defined by the system management of a system);
Number of information frames received as unicast, broadcast and multicast frames.

Every parameter to be counted, from those listed above, will have its own counter in the signaling frame. Preferably, PM signaling frames are generated periodically, and the period time can be programmable. Every frame will contain counter values for every parameter. These counter values may be located in the data field.

This way, PM parameters results could be calculated in the sink for each parameter.

2a. One of the PM Signaling Functions is a Tandem Connection Performance Monitoring (TCPM) Function This is a specific case of the PM functions, which operates on a segment of one end to end link which belongs to a distinct network administration.

The number of erroneous frames is counted at the ingress point of the segment by the source function, and the count is forwarded to the egress point of the segment (sink function) through a TCPM signaling frame. The sink function of the TCPM compares the count of the ingress point with a count obtained for the egress point to calculate the errors which have occurred in the segment.

3. Congestion Indication and Rate Control Function

This function reports the congestion status of the receiver (far) end to the transmitter (near) end. So-called buffer fill signaling frame will report the fill level of the receiver buffers to the transmitter end. The transmitter end will therefore adapt the transmitted rate accordingly by slowing down/speeding up the traffic transmitted from the transmitter (near end), and/or controlling the rate of data read from the intermediate internal buffers.

4. Connection Integrity Signaling Flow

Connection integrity (CI) signaling frames will be generated and sent to a far end with a special field which will carry an identifier of the operating source at the near end. This way the sink at the far end can verify that it is connected to the source defined by the management.

5. Round Trip Delay Measurement Signaling Function/Flow

The Round Trip Delay measurement service packets (frames) will be sent by the source, including a time tag representing the frame transmission time, to an intermediate destination, which sends the frame back to the source. The round trip delay is calculated by the source based on the time tag value received.

The above function uses a so-called loop back flow, when the loop back service frames are sent by the source to the far end sink. The far end sink will send the frames back to the source. The loop-back flow may be used for many purposes. If the loop back service frames contain time tags field both for the source and for the sink, one way and/or round trip delays can be evaluated.

Figure 5:
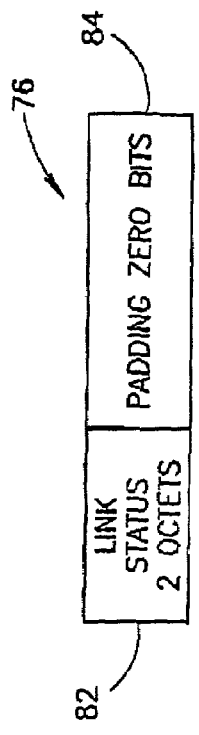
FIG. 5 schematically illustrates a structure of a data field of a particular type of service packet.

FIG. 5 assists in understanding how the signaling function "Far end link status/link indication" (FELS) is used. Reference is made to the standard basic frame format used for a service packet and illustrated in FIG. 4*a*. In case of the FELS signaling function, the Type/length field (75) of the service frame will bear the value of A003 (Hex). The DATA field's (76) structure is illustrated in the presented FIG. 5. It comprises the Link Status sub-field 82 of 2 octets, and a Stuffing sub-field 84 comprising zero bits for padding up to the required minimal Ethernet frame size (in this example, the stuffing sub-field is 44 octets, obtained as a difference between the minimal frame size, and a sum of the header-trailer fields' and the link status field's bytes, i.e., 64−(18+2)=44). For example, the following possible values, having corresponding meanings, may be carried by the link status sub-field: 000A (Hex)—link up; 00F0 (Hex)—link down; FFA0 (Hex)—link failure.

The process of forming and analyzing frames of the FELS signaling flow comprises a number of steps. The source function of a far end node forms the FELS frame every 10 milliseconds and sends it periodically to the near end sink element, carrying the far end status information. The sink function at the near end receives and identifies the frame as a FELS signaling frame, decodes the far end link status field, and if the status differs from the "link up" status (000A Hex), the near end transmitter stops transmitting to the far end. As a result, the far end will enable/disable transmission of data from the near end. As a result, the far end will enable/disable transmission of data from the near end.

Alternatively or in addition, a so-called "Alive signaling channel flow" can be arranged when the Ethernet far end link is up. "Alive channel" frames will be sent periodically whenever the Ethernet near end link is up. By adding a time tag field to the service packet of this signaling function, measurement of a one way delay through any network domain becomes possible.

The invention claimed is:

1. A method of providing a signaling channel for performing one or more signaling functions at an Ethernet level wherein telecommunication is organized by using Ethernet information packets forming an information flow, the method comprising:

monitoring at least one of said Ethernet information packets of said information flow, and external instructions;

based on results of the monitoring, producing service packets multiplexable with said Ethernet information packets, and introducing, into said service packets, data on a specific one of said signaling functions to be performed, said data being at least an indication of said signaling function to be performed;

forming from said service packets at least one service flow at the Ethernet level, wherein said service packets belonging to a specific service flow carry said indication of said signaling function to be performed;

multiplexing packets of said at least one service flow with packets of said information flow thus forming a combined flow; and utilizing for the telecommunication said combined flow comprising said information flow and said at least one service flow while said at least one service flow creates said signaling channel at the Ethernet level.

2. The method according to claim 1, the method providing said signaling channel at the Ethernet level between a first and a second operating points in a network domain, said first and second operating points being referred to as two basic operating points, the method further comprising:

arranging at said first operating point a source adaptation element capable of receiving said information flow from a first Ethernet device, arranging at said second operating point a sink adaptation element capable of transmitting said information flow to a second Ethernet device, at said source adaptation element, producing said service packets forming said at least one service flow at the Ethernet level, multiplexing said service packets of said at least one service flow with said Ethernet information packets of said information flow, thereby obtaining said combined flow, transmitting data comprised by said combined flow via said network domain from said source adaptation element to said sink adaptation element, and at said sink adaptation element, extracting said service packets of said at least one service flow from said combined flow and processing said service packets, thereby performing at least said signaling function to be performed.

3. The method according to claim 2, wherein a span of the network domain between said two basic operating points comprises at least one segment of a transport network, the method further comprising:

preserving said signaling channel during a transmitting of said combined flow via the transport network.

4. The method according to claim 3, further comprising mapping packets of said combined flow into frames of said transport network for transmitting said Ethernet information packets and said service packets via said transport network, de-mapping said frames of said transport network incorporating said combined flow, for separating said frames therefrom, thereby preserving said signaling channel at the Ethernet level.

5. The method according to claim 2, the method further comprising:

arranging one or more monitoring points between said two basic operating points.

6. The method according to claim 2, the method further comprising:

arranging, between said two basic operating points at least one additional operating point comprising at least one additional source or sink adaptation element, thereby forming two or more signaling channels between said two basic operating points.

7. The method according to claim 2, wherein a span of the network domain between said two basic operating points consists of segments which belong to Ethernet only, thereby enabling creation of said combined flow in a pure Ethernet environment.

8. The method according to claim 1, the method further comprising:

mapping packets of said combined flow into frames of a transport network for transmitting said Ethernet information packets and said service packets via said transport network.

9. The method according to claim 1, wherein at least one of said service packets has a header, the method further comprising:

indicating said specific one of said signaling functions to be performed in said header of said at least one of said service packets, and providing further data on said specific one of said signaling functions in a data field of said at least one of said service packets.

10. The method according to claim 1, wherein said one or more signaling functions are selected from at least:

a plurality of performance monitoring functions including at least one Tandem Connection function, a one way and round trip delay measurement function, a far end status function, a connection integrity check function, a buffer fill check function, a function for enabling congestion indication and rate control.

11. The method according to claim 1, the method further comprising:

de-mapping frames of a transport network incorporating said combined flow, for separating said frames, thereby preserving said signaling channel at the Ethernet level.

12. A system for creating a first signaling channel and for analyzing a second signaling channel, both of said first and second signaling channels intended for performing one or more signaling functions at an Ethernet level, the system comprising a source adaptation element and a sink adaptation element, wherein the source adaptation element is for creating the first signaling channel to be transmitted with an outgoing information flow formed by outgoing Ethernet information packets, and is capable of:

monitoring at least one of said outgoing Ethernet information packets, and external instructions, based on results of the monitoring, producing outgoing service packets multiplexable with said outgoing Ethernet information packets, and introducing, into said outgoing service packets, data on a specific one of said signaling functions to be performed, said data being at least an outgoing indication of said signaling function to be performed;

forming from said outgoing service packets at least one outgoing service flow at the Ethernet level, wherein said outgoing service packets belonging to a specific service flow carry said outgoing indication of said signaling function to be performed; and multiplexing packets of said outgoing information flow and packets of said at least one outgoing service flow, thus obtaining an outgoing combined flow, wherein said first signaling channel comprises said at least one service flow ; and the sink adaptation element is for terminating the second signaling channel and is capable of:

receiving an incoming combined flow comprising an incoming information flow of incoming Ethernet information packets and at least one incoming service flow, wherein said at least one incoming service flow is comprised by said second signaling channel and comprises incoming service packets multiplexed with said incoming Ethernet information packets;

demultiplexing said incoming combined flow to separate therefrom said at least one incoming service flow, wherein said incoming service packets belonging to said at least one incoming service flow carry an indication of said specific one or another of said signaling functions to be performed; and analyzing said at least one incoming service flow to perform at least said specific one or said another of said signaling functions respectively assigned to said at least one incoming service flow.

13. The system according to claim 12, wherein the first signaling channel and the second signaling channel are a same signaling channel.

14. The system according to claim 12, the system further comprising a mapping block for transmitting said outgoing combined flow via a transport network, thereby ensuring transmission of the first signaling channel via the transport network.

15. The system according to claim 12, the system further comprising a de-mapping block for obtaining said incoming combined flow from frames of a transport network which envelope said incoming combined flow, thereby ensuring reception of the second signaling channel via the transport network and analysis thereof at the Ethernet level.

16. A method for providing a signaling channel for performing one or more signaling functions at an Ethernet level wherein telecommunication is organized by using Ethernet information packets forming an information flow, the method comprising:

monitoring at least one of said Ethernet information packets of said information flow, and external instructions;

based on results of the monitoring, producing service packets multiplexable with said Ethernet information packets, and introducing, into said service packets, data on a specific one of said signaling functions to be performed, said data being at least an indication of said signaling function to be performed;

forming from said service packets at least one service flow at the Ethernet level, wherein said service packets belonging to a specific service flow carry said indication of said signaling function to be performed; and multiplexing packets of said at least one service flow with packets of said information flow thus forming a combined flow, while said at least one service flow is comprised by the signaling channel at the Ethernet level;

wherein said one or more signaling functions enable achieving for the telecommunication at least one of:
performance monitoring;
far end status indication, including remote failure indication;
remote loopback, including one way and round trip delay measurement;
link monitoring, including connection integrity check;
buffer fill check;
congestion indication; and
rate control.

17. A set of adaptation equipment for an Ethernet network node communicating with a transport network, the set supporting at least one signaling channel at an Ethernet level, the set comprising at least one of:

a source adaptation element for creating an outgoing signaling channel for performing one or more signaling functions at the Ethernet level; and a sink adaptation element for terminating an incoming signaling channel for performing said one or more signaling functions at the Ethernet level, wherein said source adaptation element comprises:

a monitor for monitoring at least one of: outgoing Ethernet information packets forming an outgoing information flow, and external instructions;

a source function block for producing service packets multiplexable with said outgoing Ethernet information packets based on results of the monitoring, wherein said source function block introduces, into said service packets, data on said one or more signaling functions, said data being at least an indication of a specific one of said signaling functions to be performed, and wherein said source function block forms from said service packets at least one outgoing service flow at the Ethernet level, wherein said service packets belonging to a particular outgoing service flow carry said indication of said specific one of said signaling functions to be performed, a multiplexer for multiplexing packets of said at least one outgoing service flow with said outgoing Ethernet information packets thus obtaining an outgoing combined flow, wherein the outgoing signaling channel comprises said at least one outgoing service flow, and a mapping block for mapping packets of said outgoing combined flow into frames of the transport network for transporting thereof via the transport network; and wherein said sink adaptation element comprises:

a de-mapping block which receives frames of the transport network that envelope an incoming combined flow, and de-maps the received frames of the transport network thus obtaining therefrom the incoming combined flow comprising an incoming information flow of incoming Ethernet information packets and at least one incoming service flow, wherein said at least one incoming service flow comprises incoming service packets multiplexed with said incoming Ethernet information packets, a de-multiplexer for demultiplexing said incoming combined flow to separate therefrom said at least one incoming service flow, wherein said service packets belonging to said at least one incoming service flow carry an indication of said specific one or another of said signaling functions, and a sink function block for analyzing said at least one incoming service flow to perform at least said specific one or said another of said signaling functions respectively assigned to said incoming service flow.

* * * * *